_United States Patent Office_

3,455,980
Patented July 15, 1969

3,455,980
PENTACOORDINATE SILICON COMPLEXES OF VICINAL ALIPHATIC DIOLS
Cecil L. Frye, c/o Dow Corning Corp., Midland, Mich. 48640
No Drawing. Filed Dec. 12, 1966, Ser. No. 600,762
Int. Cl. C07d *103/04;* C08g *22/34*
U.S. Cl. 260—448.8                    15 Claims

---

ABSTRACT OF THE DISCLOSURE

This invention relates to new pentacoordinate silicon complexes and a method of preparing them. More specifically, this invention relates to a pentacoordinate silicon complex of the general formula wherein each R is selected from the group consisting of hydrogen atoms and monovalent radicals attached to the carbon atom via a carbon-to-carbon bond, R′ is a monovalent radical attached to the oxygen atom via a carbon-to-oxygen bond and A is a cation formed from an amine.
This invention also relates to a pentacoordinate silicon complex of the general formula wherein each R is selected from the group consisting of hydrogen atoms and monovalent radicals attached to the carbon atom via a carbon-to-carbon bond, each R″ is a monovalent radical attached to the silicon atom via a carbon-to-silicon bond, $x$ is an integer, and A is a cation formed from an amine.
These complexes are useful as latent catalyst-hardeners for urethane polymers.

---

This invention further relates to a method for preparing a pentacoordinate silicon complex of the general formula wherein each R is selected from the group consisting of hydrogen atoms and monovalent radicals attached to the carbon atom via a carbon-to-carbon bond, R′ is a monovalent radical attached to the oxygen atom via a carbon-to-oxygen bond and A is a cation formed from an amine, said method comprising reacting
(1) a compound of the formula (R′O)$_4$Si wherein R′ is as defined above,
(2) a vicinal diol of the formula

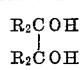

wherein R is as defined above, and
(3) an amine.

Extracoordinate silicon complexes have been known to exist for quite some time—see French Patent 1,433,678 and the references cited therein. In the Journal of the American Chemical Society, 86, 3170 (1964), it was disclosed that hexacoordinate silicon complexes like those prepared by Rosenheim et al. can be made by reacting ethyl silicate, catechol and an amine. It was also disclosed, as in the French patent supra, that pentacoordinate silicon complexes can be made by reacting an appropriate trialkoxysilane with catechol and an amine. It was further taught in footnote (6) of the JACS article that pentacoordinate silicon complexes could be made by reacting an appropriate trialkoxysilane with an aliphatic 1,2-diol (a vicinal diol) and an amine. It would be expected from these teachings that if one reacted ethyl silicate, an aliphatic 1,2-diol and an amine, he would obtain a hexacoordinate silicon complex. It has been found, however, that when one carries out such a reaction that there is unexpectedly produced instead a pentacoordinate silicon complex.

The pentacoordinate silicon complexes of this invention are defined by the general formulae

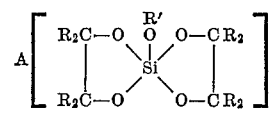

and

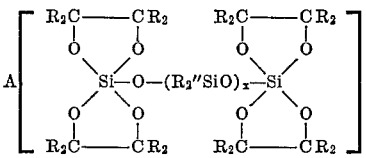

In these formulae each R can either be hydrogen atom or a monovalent radical attached to the silicon atom via a carbon-to-carbon bond. Thus R can be, for example, alkyl, alkenyl, cycloalkyl, aryl, aralkyl or alkaryl radicals; the corresponding halogenated radicals; the corresponding amino and cyano substituted radicals; and the corresponding carboxy substituted radicals. It is preferred that the R radicals be hydrogen atoms or contain from 1 to 18 carbon atoms. Specific examples of R radicals are the methyl, ethyl, propyl, butyl, amyl, hexyl, 2-ethylhexyl, decyl, dodecyl, octadecyl, eicosyl, heptacosyl, vinyl, allyl, hexenyl, cyclohexyl, phenyl, xenyl, naphthyl, benzyl, 2-phenylethyl, tolyl, bromomethyl, trifluoromethyl, chlorocyclohexyl, aminophenyl, cyanophenyl, carboxyphenyl, aminoxenyl and carboxyethyl radicals.

In the first formula the R′ radical is a monovalent radical attached to the oxygen atom via a carbon-to-oxygen bond. Thus the R′ radical can be any of those radicals illustrated for R above. Preferably R′ is an alkyl radical containing from 1 to 6 carbon atoms.

In the second formula the R″ radical can be any monovalent radical attached to the silicon atom via a carbon-to-silicon (C-Si) bond. Thus the R″ radical can be any of those illustrated for R above. Preferably R″ is a hydrocarbon or halohydrocarbon radical containing from 1 to 6 carbon atoms. The methyl, ethyl, vinyl, phenyl and 3,3,3-trifluoropropyl are the most preferred species at this time.

In the above formulae A is a cation formed from an amine. The amine can be a primary, secondary or tertiary aliphatic or aromatic amine, an alkanolamine, a quaternary ammonium compound, or other similar amino type compounds. Specific examples of amines that can be used include methylamine, ethylamine, propylamine, isopropylamine, butylamine, amylamine, hexylamine, decylamine, dodecylamine, octadecylamine, dimethylamine, diethylamine, methylamylamine, triethylamine, tripropylamine, diethylmethylamine, cyclohexylamine, benzyldimethylamine, aniline, dimethylaniline, toluidine, ethanolamine, diethanolamine, triethanolamine, ethylenediamine, cadaverine, hexamethylenediamine, diethylenetriamine, pyridine, guanidine, tetramethylguanidine, melamine, ammonia (or ammonium hydroxide), tetramethylammonium hydroxide, trimethyl-beta-hydroxyethylammonium hydroxide, benzyltrimethylammonium hydroxide, cetyltrimethylammonium hydroxide, tallowtrimethylammonium hydroxide and 2,4,6-tri-(dimethylaminoethyl) phenol.

During the formation of the complexes of this invention one or more of the nitrogen atoms of the amine becomes protonated thus forming the cation A. Thus, for example, a polyamine such as ethylenediamine can form either the monovalent $H_2NCH_2CH_2NH_3^+$ cation or the divalent $+H_3NCH_2CH_2NH_3+$ cation. The portion of the complex shown in brackets in the above formulae is a monovalent anion in the case of the first formula and a divalent anion in the case of the second formula which contains the siloxane linkage. The number of cations and anions in the complex is such as to provide an overall neutrality. Stated another way, there is an equal number of positive and negative charges in the complex. By way of example, when the anion is monovalent and cation A is monovalent there is one of each. When the anion is monovalent and cation A is divalent there must be two anions in the complex. When the anion is divalent and cation A is monovalent there must be two A's in the complex and so on.

The best method known at the present time for preparing the complexes of this invention is by reacting a mixture of a silicate, a vicinal aliphatic diol and an amine in a suitable solvent. The reaction conditions can range from simply combining the reactants at ambient temperature to boiling the mixture. Various solvents can be used but the polar solvents such as acetonitrile are generally preferred.

The silicates useful in the preparation of the complexes are defined by the formula $(R'O)_4Si$ wherein R' is a monovalent radical attached to the oxygen atom via a carbon-to-oxygen (C—O) bond. These radicals have been illustrated above.

The vicinal diols useful in the preparation of the complexes are materials well known in the art and are defined by the formula

wherein each R is either a hydrogen atom or a monovalent radical attached to the carbon atom via a carbon-to-carbon (C—C) bond. These radicals have also been illustrated above.

The amines useful in the preparation have likewise been illustrated above.

Now in order that those skilled in the art may better understand how the present invention can be practiced, the following examples are given by way of illustration and not by way of limitation. All percents referred to herein are on a weight basis unless otherwise specified.

EXAMPLE 1

To 2.60 g. of

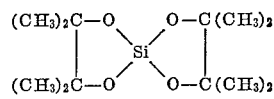

and 2.02 g. of triethylamine there was added 0.64 g. of methanol which caused the crystalline spirosilicate to exothermally dissolve. Upon cooling in a refrigerator, crystallization occurred. The supernatant liquid was decanted, the crystalline solid quickly washed with pentane, and then evacuated free of residual volatile solvent. The resulting product was

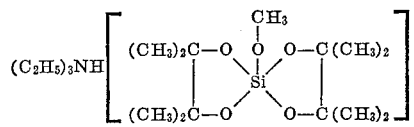

and found to have a neutral equivalent of 416 (theoretical 393).

EXAMPLE 2

A solution of 20.8 g. of $(C_2H_5O)_4Si$, 23.6 g. of pinacol and 7.5 g. of 3-aminopropanol-1 in 50 g. of acetonitrile was heated at reflux for 50 hours. After cooling to room temperature, the crystalline product was removed by filtration, washed with a little acetonitrile, and then vacuum dried. The product was

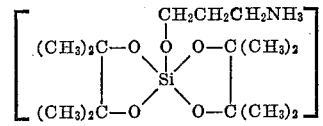

and found to have a neutral equivalent of 339 (theoretical 335).

EXAMPLE 3

To a solution of 2.60 g. of

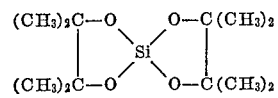

in 10 cc. of benzene there was added 0.75 g. of 3-aminopropanol-1 which resulted in the immediate and exothermic deposition of a crystalline solid. This solid was isolated by filtration, washed well with hexane, and vacuum dried to give a quantitative yield of 3.3 g. of the zwitterion product of Example 2. This product had a melting point of 190–195° C. and a neutral equivalent of 336. The infrared spectrum of this product was identical to that of the product of Example 2.

EXAMPLE 4

To a 250 ml. suction flask there was added 20.8 g. of $(C_2H_5O)_4Si$, 15.5 g. of ethylene glycol, 5.9 g. of hexamethylenediamine and 35 cc. of acetonitrile. A white crystalline solid formed immediately as the reactants were swirled together. After boiling for one hour, the solid was removed by filtration, washed with fresh acetonitrile, and then vacuum dried to obtain 15 g. of the crystalline product

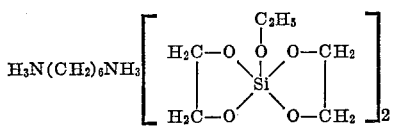

which was found to have a neutral equivalent of 252 (theoretical 251).

EXAMPLE 5

To a one ounce vial there was added 2.1 g. of

10 g. of perfluoropinacol and 3.03 g. of triethylamine. The addition of the amine was accompanied by the evolution of much heat and upon subsequent cooling to room temperature the vial contents crystallized. This material was filtered, washed with hexane, and then exacuated to constant weight to obtain 11 g. of the simple crystalline triethylamine salt of perfluoropinacol. 10 g. of this salt was then heated for one hour at 140–150° C. with 2.1 g. of $(C_2H_5O)_4Si$. Recrystallization of the resulting dark colored product three times from toluene yielded 4 g. of

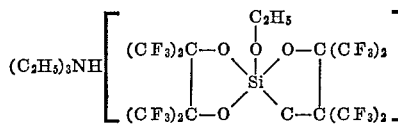

which was found to have a neutral equivalent of 859 (theoretical 839). It is noted that this and the other fluorinated products of this invention are initially neutral in glacial acetic acid, but are titratable as bases upon long standing at room temperature or upon heating at reflux.

This complex was found to be very soluble in oxygenated solvents such as tetrahydrofuran, acetic acid, alcohols and acetone, and only poorly soluble in aliphatic hydrocarbons.

Elemental analysis of the product gave the following results:

Theoretical (percent): C, 28.6; H, 2.5; F, 54.3; Si, 3.35. Found: C, 28.9; H, 2.6; F, 53.8; Si, 3.28.

EXAMPLE 6

A solution of 2.1 g. of (C₂H₅O)₄Si, 6.7 g. of perfluoropinacol and 1.0 g. of dimethylaminoethanol in 10 g. of o-xylene was heated at boiling which caused the formation of a dense white crystalline solid. This crystalline material was washed twice with hot xylene, once with hexane, and then evacuated to constant weight. The product

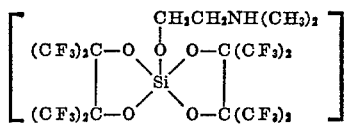

was found to have a neutral equivalent of 782 (theoretical 781). Elemental analysis of the product gave the following results:

Theoretical (percent): C, 24.6; H, 1.41; F, 58.4. Found: C, 24.7; H, 1.88; F, 60.3.

EXAMPLE 7

A solution of 20.8 g. of (C₂H₅O)₄Si, 19 g. of propylene glycol and 13.2 g. of hexamethylenediamine in 50 g. of acetonitrile was heated at reflux for 100 hours during which time by-produced ethanol was removed. Upon cooling overnight in a refrigerator, a white solid precipitated. This solid was filtered with the aid of a rubber dam, to protect it from the atmosphere, and evacuated to constant weight. The product

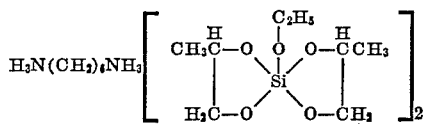

was found to have a neutral equivalent of 281 (theoretical 280). The product has no melting point, i.e., it decomposes before melting.

EXAMPLE 8

A solution of 83.2 g. of (C₂H₅O)₄Si, 76 g. of propylene glycol and 41.2 g. of diethylenetriamine in 70 cc. of acetonitrile was heated at reflux for one hour and then allowed to stand in a refrigerator for four days whereupon a crystalline material formed. This material was isolated and then washed, first with acetonitrile, then pentane, and then evacuated to constant weight. The product

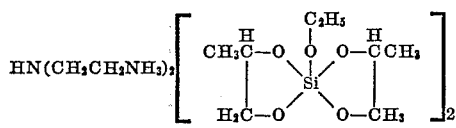

was found to have a neutral equivalent of 182 (theoretical 191). The product, like that of Example 7, has no melting point.

EXAMPLE 9

A solution of 6.7 g. of perfluoropinacol, 1.8 g. of hexaethoxydisiloxane and 1.1 g. of triethylamine in 6 g. of toluene was heated at boiling for one hour and then cooled to room temperature whereupon a crystalline solid formed. This solid was isolated, washed with toluene, then washed with hexane, and then evacuated to constant weight to obtain 1.7 g. of

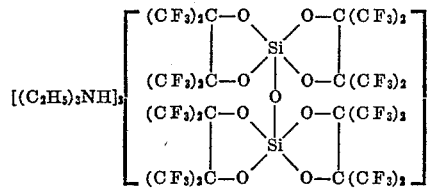

which is insoluble in boiling heptane. The structure of the product was confirmed by nuclear magnetic resonance analysis. Elemental analysis of the product gave the following results.

Theoretical (percent): C, 26.9; H, 2.0; F, 56.8. Found: C, 27.7; H, 2.41; F, 55.3.

EXAMPLE 10

When the silicates listed below are substituted for the ethylsilicate of Example 4, the indicated products are obtained.

| | Silicate | Product |
|---|---|---|
| (A) | (C₃H₇O)₄Si | H₃N(CH₂)₆NH₃ [structure with C₃H₇] |
| (B) | (C₈H₁₇O)₄Si | H₃N(CH₂)₆NH₃ [structure with C₈H₁₇] |
| (C) | (C₆H₅O)₄Si | H₃N(CH₂)₆NH₃ [structure with C₆H₅] |
| (D) | (CH₃O CH₂CH₂O)₄Si | H₃N(CH₂)₆NH₃ [structure with CH₂CH₂O CH₂] |
| (E) | (CF₃CH₂CH₂O)₄Si | H₃N(CH₂)₆NH₃ [structure with CH₂CH₂CF₃] |

EXAMPLE 11

When $(C_2H_5O)_4Si$ is reached with the vicinal aliphatic diols and amines listed below using the general procedure of Example 2, the indicated products are obtained.

EXAMPLE 12

When the siloxanes, vicinal aliphatic diols, and amines listed below are reacted using the general procedure of Example 9, the indicated products are obtained.

| | Diol | Amine | Product |
|---|---|---|---|
| (A) | $C_6H_5\underset{OH}{\overset{CH_3}{C}}\text{—}\underset{OH}{\overset{CH_3}{C}}C_6H_5$ | $H_2NCH_2CH_2NH_2$ | $H_2NCH_2CH_2NH_3\left[\begin{array}{c}C_6H_5\underset{CH_3}{\overset{CH_3}{C}}\text{—O}\quad\overset{C_2H_5}{\underset{\phantom{|}}{O}}\quad O\text{—}\underset{CH_3}{\overset{CH_3}{C}}C_6H_5\\ \text{Si}\\ C_6H_5\underset{CH_3}{\overset{\phantom{|}}{C}}\text{—O}\quad\phantom{O}\quad O\text{—}\underset{CH_3}{\overset{\phantom{|}}{C}}C_6H_5\end{array}\right]$ |
| (B) | $C_6H_5\underset{OH}{\overset{H}{C}}\text{—}\underset{OH}{\overset{H}{C}}C_6H_5$ | $C_4H_9NH_2$ | $C_4H_9NH_3\left[\begin{array}{c}C_6H_5\overset{H}{\underset{\phantom{|}}{C}}\text{—O}\quad\overset{C_2H_5}{\underset{\phantom{|}}{O}}\quad O\text{—}\overset{H}{\underset{\phantom{|}}{C}}C_6H_5\\ \text{Si}\\ C_6H_5\overset{H}{\underset{\phantom{|}}{C}}\text{—O}\quad\phantom{O}\quad O\text{—}\overset{H}{\underset{\phantom{|}}{C}}C_6H_5\end{array}\right]$ |
| (C) | cyclopentane-1,2-diol | piperidine (S NH) | 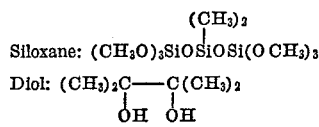 |
| (D) | $(CH_3)_2\underset{OH}{C}\text{—}\underset{OH}{C}(CH_3)_2$ | $(C_6H_5CH_2)(CH_3)_2N$ | $(C_6H_5CH_2)(CH_3)_2NH\left[\begin{array}{c}(CH_3)_2C\text{—O}\quad\overset{C_2H_5}{\underset{\phantom{|}}{O}}\quad O\text{—}C(CH_3)_2\\ \text{Si}\\ (CH_3)_2C\text{—O}\quad\phantom{O}\quad O\text{—}C(CH_3)_2\end{array}\right]$ |
| (E) | $(CH_3)_2\underset{OH}{C}\text{—}\underset{OH}{C}(CH_3)_2$ | $(CH_3)_4NOH$ | $(CH_3)_4N\left[\begin{array}{c}(CH_3)_2C\text{—O}\quad\overset{C_2H_5}{\underset{\phantom{|}}{O}}\quad O\text{—}C(CH_3)_2\\ \text{Si}\\ (CH_3)_2C\text{—O}\quad\phantom{O}\quad O\text{—}C(CH_3)_2\end{array}\right]$ |
| (F) | $(CF_3)_2\underset{OH}{C}\text{—}\underset{OH}{C}(CF_3)_2$ | $(C_6H_5CH_2)(CH_3)_2NOH$ | $(C_6H_5CH_2)(CH_3)_2N\left[\begin{array}{c}(CF_3)_2C\text{—O}\quad\overset{C_2H_5}{\underset{\phantom{|}}{O}}\quad O\text{—}C(CF_3)_2\\ \text{Si}\\ (CF_3)_2C\text{—O}\quad\phantom{O}\quad O\text{—}C(CF_3)_2\end{array}\right]$ |

(A)

Siloxane: $(CH_3O)_3SiO\underset{\underset{(CH_3)_2}{|}}{Si}OSi(OCH_3)_3$

Diol: $(CH_3)_2\underset{OH}{C}\text{—}\underset{OH}{C}(CH_3)_2$

Amine: $(C_2H_5)_3N$

Product:
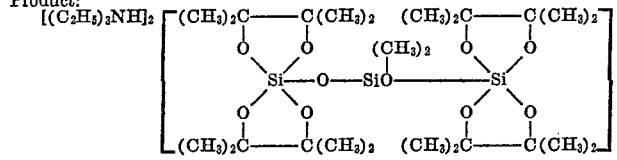

(B)

Siloxane: $(C_3H_7O)_3SiO[(CH_3)(CF_3CH_2CH_2)SiO]_3Si(OC_3H_7)_3$

Diol: $H_2\underset{OH}{C}\text{—}\underset{OH}{C}H_2$

Amine: $C_6H_5CH_2(CH_3)_3NOH$

Product:
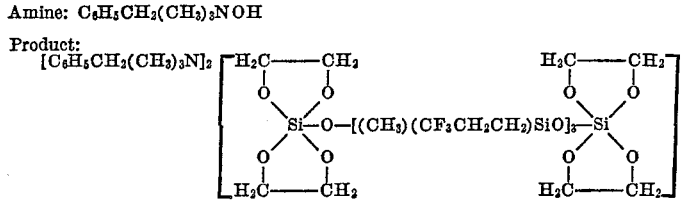

(C)

Siloxane: (C₂H₅O)₃SiO[(CH₃)(C₆H₅)SiO]₁₀Si(OC₂H₅)₃

Diol: 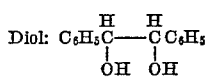

Amine: NH₃

Product:
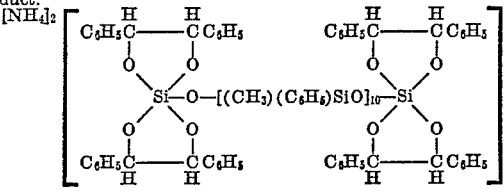

EXAMPLE 13

The complexes of this invention are useful as latent catalyst-hardeners for urethane polymers as will be illustrated by this example.

The complex of Example 4 was mixed with a commercial isocyanate terminated polyurethane prepolymer at a 4.3 to 10 weight ratio. The prepolymer had an NCO content of 10.6% by weight and an equivalent weight per NCO group of 396. The resulting heavy paste-like mixture was used to adhere two untreated aluminum panels using a one-half inch overlap. This combination was cured for 5 minutes at 350° F. (177° C.) and then the strength of the bond measured by pulling the panels at 180° to each other. This is a standard "lap-shear" test. This bond had 2128 pounds per square inch strength showing the complex had done an excellent job of curing the prepolymer.

That which is claimed is:

1. A pentacoordinate silicon complex selected from the group consisting of those of the general formulae (1) 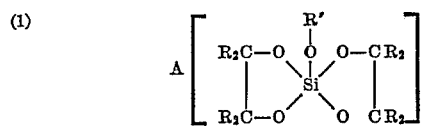

and (2) 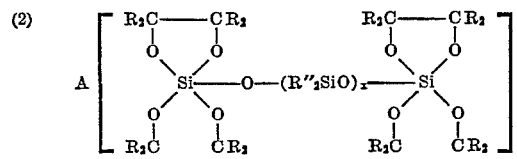

in which formulae each

R is selected from the group consisting of hydrogen atoms and alkyl, alkenyl, cycloalkyl, aryl, aralkyl, alkaryl, haloalkyl, haloalkenyl, halocycloalkyl, haloaryl, haloaralkyl, haloalkaryl, aminoalkyl, aminoalkenyl, aminocycloalkyl, aminoaralkyl, aminoalkaryl, cyanoalkyl, cyanoalkenyl, cyanocycloalkyl, cyanoaryl, cyanoaralkyl, cyanoalkaryl, carboxyalkyl, carboxyalkenyl, carboxycycloalkyl, carboxyaryl, carboxyaralkyl and carboxyalkaryl radicals, R' is selected from the group consisting of alkyl, alkenyl, cycloalkyl, aryl, aralkyl, alkaryl, haloalkyl, haloalkenyl, halocycloalkyl, haloaryl, haloaralkyl, haloalkaryl, aminoalkyl, aminoalkenyl, aminocycloalkyl, aminoaryl, aminoaralkyl, aminoalkaryl, cyanoalkyl, cyanoalkenyl, cyanocycloalkyl, cyanoaryl, cyanoaralkyl, cyanoalkaryl, carboxyalkyl, carboxyalkenyl, carboxycycloalkyl, carboxyaryl, carboxyaralkyl and carboxyalkaryl radicals, and is attached to the oxygen atom via a carbon-to-oxygen bond, each R" is selected from the group consisting of alkyl, alkenyl, cycloalkyl, aryl, aralkyl, alkaryl, haloalkyl, haloalkenyl, halocycloalkyl, haloaryl, haloaralkyl, haloalkaryl, aminoalkyl, aminoalkenyl, aminocycloalkyl, aminoaryl, aminoaralkyl, aminoalkaryl, cyanoalkyl, cyanoalkenyl, cyanocycloalkyl, cyanoaryl, cyanoaralkyl, cyanoalkaryl, carboxyalkyl, carboxyalkenyl, carboxycycloalkyl, carboxyaryl, carboxyaralkyl and carboxyalkaryl radicals, and is attached to the silicon atom via a carbon-to-silicon bond, A is a cation formed from an amine, and x is an integer.

2. A pentacoordinate silicon complex as defined in claim 1 which has Formula 1.

3. A complex as defined in claim 2 wherein each R is a hydrogen atom and R' is an alkyl radical containing from 1 to 6 carbon atoms.

4. A complex as defined in claim 3 which has the formula

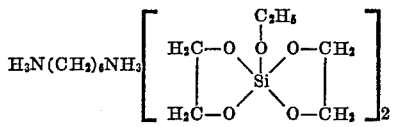

5. A complex as defined in claim 2 wherein each R is a monovalent hydrocarbon radical and R' is an alkyl radical containing from 1 to 6 carbon atoms.

6. A complex as defined in claim 5 which has the formula

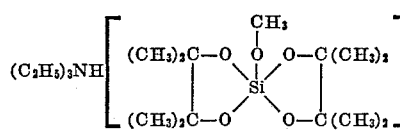

7. A complex as defined in claim 2 which has the formula

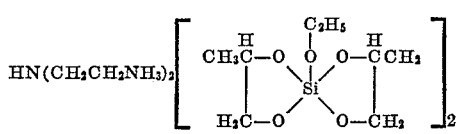

8. A complex as defined in claim 2 which has the formula

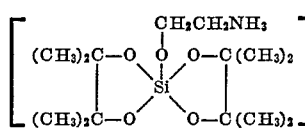

9. A complex as defined in claim 2 wherein each R is a monovalent halohydrocarbon radical and R' is an alkyl radical containing from 1 to 6 carbon atoms.

10. A complex as defined in claim 9 which has the formula

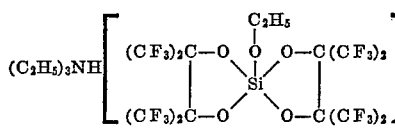

11. A complex as defined in claim 2 which has the formula

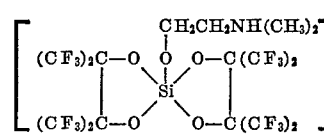

12. A pentacoordinate silicon complex as defined in claim 1 which has Formula 2.

13. A complex as defined in claim 12 which has the formula

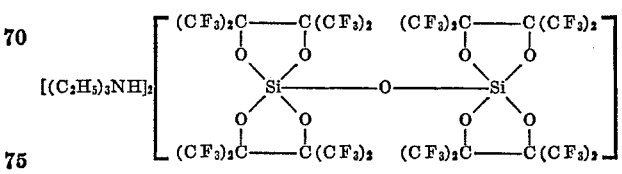

14. A complex as defined in claim 12 which has the formula

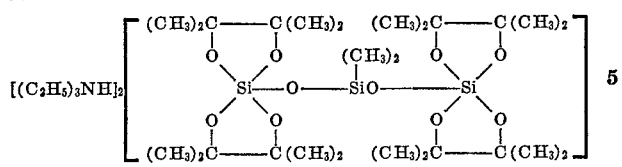

15. A method for preparing a pentacoordinate silicon complex of the general formula

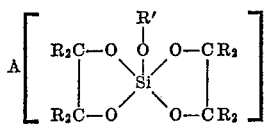

wherein each

R is selected from the group consisting of hydrogen atoms and alkyl, alkenyl, cycloalkyl, aryl, aralkyl, alkaryl, haloalkyl, haloalkenyl, halocycloalkyl, haloaryl, haloaralkyl, haloalkaryl, aminoalkyl, aminoalkenyl, aminocycloalkyl, aminoaryl, aminoaralkyl, aminoalkaryl, cyanoalkyl, cyanoalkenyl, cyanocycloalkyl, cyanoaryl, cyanoaralkyl, cyanoalkaryl, carboxyalkyl, carboxyalkenyl, carboxycycloalkyl, carboxyaryl, carboxyaralkyl and carboxyalkaryl radicals, R' is selected from the group consisting of alkyl, alkenyl, cycloalkyl, aryl, aralkyl, alkaryl, haloalkyl, haloalkenyl, halocycloalkyl, haloaryl, haloaralkyl, haloalkaryl, aminoalkyl, aminoalkenyl, aminocycloalkyl, aminoaryl, aminoaralkyl, aminoalkaryl, cyanoalkyl, cyanoalkenyl, cyanocycloalkyl, cyanoaryl, cyanoaralkyl, carboxyalkyl, carboxyalkenyl, carboxycycloalkyl, carboxyaryl, carboxyaralkyl and carboxyalkaryl radicals, and is attached to the oxygen atom via a carbon-to-oxygen bond, and A is a cation formed from an amine, said method comprising reacting (1) a compound of the formula $(R'O)_4Si$ wherein R' is as defined above, (2) a vicinal aliphatic diol of the formula

wherein R is as defined above, and (3) an amine.

References Cited
UNITED STATES PATENTS 3,355,477  11/1967  Frye _____ 260—448.8
3,360,525  12/1967  Frye _____ 260—448.8 X TOBIAS E. LEVOW, Primary Examiner P. F. SHAVER, Assistant Examiner U.S. Cl. X.R.

260—46.5, 77.5, 249.7, 290, 482, 564